Figures 2, 3:
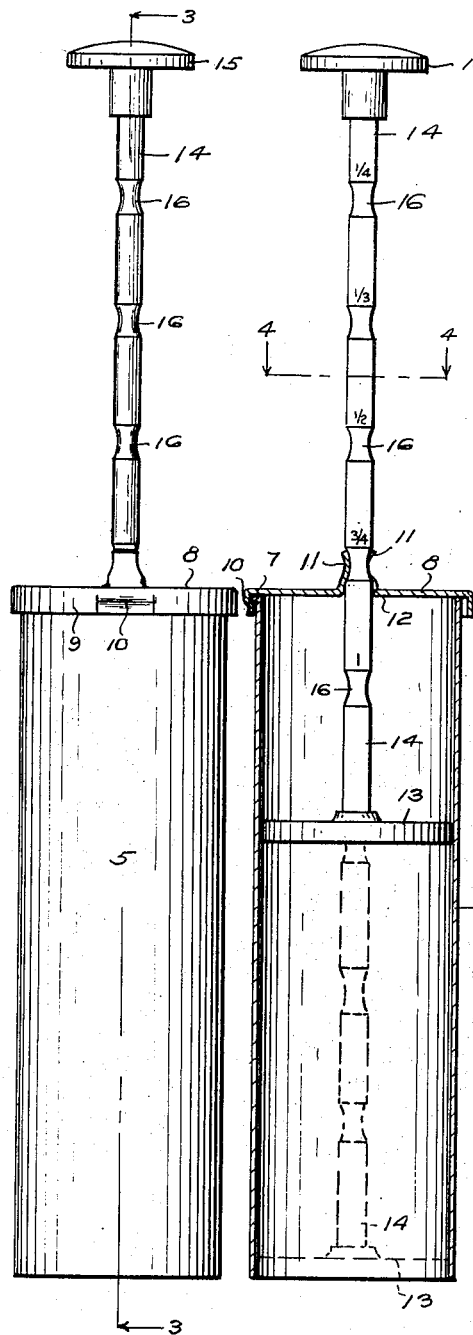

July 3, 1951  J. J. YEAROUT  2,558,998

MEASURING AND DISPENSING DEVICE

Filed June 4, 1949

INVENTOR.
JEAN JONES YEAROUT,
BY
ATTORNEY.

Patented July 3, 1951

2,558,998

UNITED STATES PATENT OFFICE 2,558,998

MEASURING AND DISPENSING DEVICE

Jean Jones Yearout, Fort Lauderdale, Fla.

Application June 4, 1949, Serial No. 97,111

1 Claim. (Cl. 222—49)

This invention relates to an improvement in a combined measuring and dispensing device for semi-fluid materials, such as shortening, butter or the like and has for its object the provision of a device which may be adjusted to a predetermined quantity, charged with the shortening, butter or the like from a conventional commercial container to the point at which the device has been set and then, by a simple hand pressure, to discharge the measured quantity of material into a bowl, pan or other receptacle wherein it is desired.

An object of the invention resides in a cylindrical measuring device open at its lower end and provided with a piston operable therein to be adjusted at a predetermined point in the cylinder, determined by a gauge means carried by the device and the cylinder then charged through its open end from a commercial container to a point determined by the piston and then upon being so charged, to be transferred to a bowl or other receptacle and discharged from the open end of the cylinder by movement of the piston downwardly.

A further object of the invention resides in a combined measuring and dispensing device embodying a cylinder and a piston operable therein and definitely located at predetermined degrees of elevation in the cylinder corresponding to well recognized kitchen measuring devices, such as ¼, ⅓, ½, ¾ and 1 cup full, with the piston controllable by a piston rod, upon which has been positioned definite points of measurement and means carried by the cylinder to engage and resiliently hold the rod in the adjusted position, such resiliently controlled means permitting the rod to be forced downwardly for moving the piston for a discharge of the measured quantity of semi-fluid material from the cylinder.

A further object of the invention resides in an extremely simple construction, embodying novel stop means for the piston rod calculated to resiliently hold the rod against shifting while the cylinder is being charged and which, when pressure is exerted upon the upper end of the rod, readily permits the rod to slide downwardly for a discharge movement of the piston, is easily disassembled for cleaning, is cheap to manufacture, strong, durable and highly efficient as a kitchen implement, avoids the usually inaccurate methods of measuring shortening, etc., is simple and clean to operate and has other useful purposes, such as cutting biscuits, cookies and the like.

Figure 1:
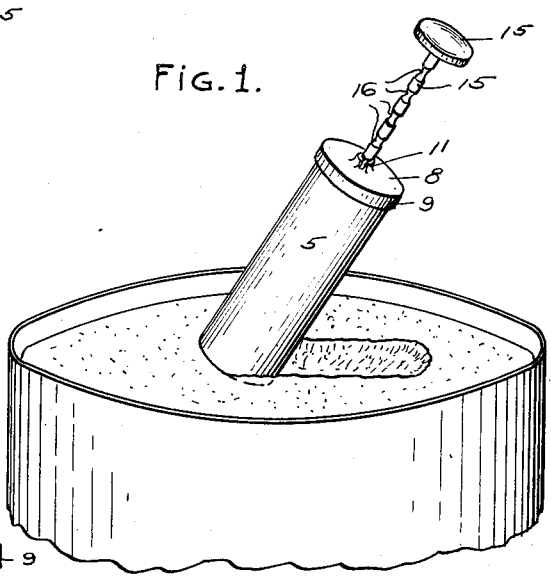
Figure 4:
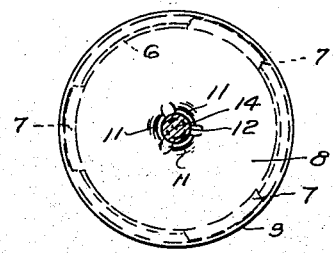
Figure 5:
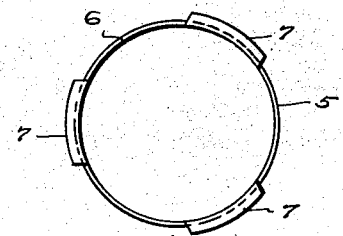

Referring to the drawings, wherein has been illustrated a preferred embodiment of the invention and wherein like characters of reference are employed to designate like parts throughout the several figures;

Figure 1 is a perspective view of the invention, illustrating the method of charging and measuring, Figure 2 is a side elevation thereof, Figure 3 is a vertical central sectional view thereof, taken on line 3—3 of Figure 2, Figure 4 is a horizontal section, taken on line 4—4 of Figure 3 and, Figure 5 is a top plan view of the cylinder, with associated parts removed.

Referring specifically to the drawings, the numeral 5 designates an elongated cylinder, open at its top and bottom, as shown. The top edge 6 is provided with equidistantly spaced lateral flange sections 7, for the detachable reception of a closure cap 8. The cap 8 is held in operative position upon the top 6, by an annular downturned flange 9, having inwardly projecting lugs 10, adapted to engage beneath the flange sections 7, when the cap is rotated. Centrally of the cap 8, is a plurality of upstanding and inwardly curved spring tensioned detents 11, preferably struck from the cap 8. The detents 11 are equidistantly spaced around a central opening 12 in the cap, formed by the stamping of the detents 11. While the detents are here shown as being formed integral with the cap, it may be found desirable in practice to form them of a separate stamping and weld or otherwise attach them to the cap.

Slidable in the cylinder 5, is a piston 13, having sufficient clearance with the cylinder wall to permit freedom of movement, yet fitting sufficiently close so as to avoid leakage of semi-fluent material therepast when the device is being charged or discharged. The piston is carried by a piston rod 14, preferably cylindrical in shape, that extends upward through the opening 12 of the cap and terminates in an operating button or head 15.

The rod 14 is grooved circumferentially at equidistantly and predetermined points, as at 16 and is adapted, in use, to engage and be held by the engagement of the detents 11 in such grooves. The several grooves determine the quantity of material that can be forced into the cylinder for abutment with the piston and, in this form of the invention are employed to indicate the conventional kitchen cup measurements of ¼, ⅓, ½, ¾ and 1 cup, and the particular groove engaged by the detent determines the point at which the piston will be positioned in the cylinder.

In the use of the device, the piston rod 14 is adjusted up or down to the desired quantity of shortening or the like to be measured, the detent engaging in the selected groove, indicating that the piston has been adjusted from the bottom of the cylinder to permit the required quantity of shortening to be forced therein. The cylinder is then grasped bodily and held at an angle and scraped over the surface of the can of shortening, as indicated in Figure 1, causing the shortening to be forced into the cylinder. This is continued until the cylinder is filled to its lower end. Excess material is scraped from the lower end of the cylinder by scraping the end over the edge of the shortening can. The cylinder is now charged with the predetermined quantity of material, accurately measured. The cylinder is then transferred to the bowl, pan or other receptacle into which the shortening is to be discharged and the piston rod is then forced downwardly by a pressure upon the head 15, fully discharging the contents of the cylinder. As shown by dotted lines, the lowermost position of the piston is flush with the discharge end of the cylinder, thus insuring a complete discharge of the contents.

It will thus be apparent, that a very simple and highly practicable kitchen measuring device has been provided. The device has no complicated or expensive parts, is easily disassembled for cleaning, is accurate for the purposes intended and avoids the usually messy procedure now employed to measure such semi-fluid substances as shortening, butter and the like. The device also has other kitchen uses, such as cutting biscuits, cookies or the like and when used in this connection, the biscuits are cut by pressing the lower open end of the cylinder into the dough, removing and then expelling the cut biscuit by pressing the rod 14 down and the piston discharges the biscuit in a desirable place. Cookies and biscuits are therefore rapidly cut and deposited with a minimum of effort.

It is to be understood, that the invention is not limited to the precise arrangement shown, but that it includes within its purview, whatever changes fairly come within either the terms or the spirit of the appended claim.

Having described my invention, what I claim as new and desire to secure by Letters Patent is:

A measuring and dispensing device for shortening comprising an elongated cylinder open at top and bottom, with the bottom serving as a scraping edge, lateral flange sections formed on the upper end of the cylinder, a cap member for engagement over the upper end of the cylinder, a depending flange carried by the cap, lugs formed on the depending flange for engagement beneath the flange sections of the cylinder, said cap provided with a centrally arranged opening, integral spring detents struck from the cap and radially disposed around the opening, a piston slidable in the cylinder, a piston rod controlling the piston, said rod passing through the opening of the cap and having contact with the detents, a head carried by the rod at its free end, said rod grooved circumferentially at predetermined points in its length, said spring detents adapted to jointly engage in a selected groove for positioning the rod and piston at a predetermined elevation, indicia upon the rod adjacent each groove to indicate a measured quantity, said piston in its lowermost position for dispensing adapted to be positioned flush with the lower edge of the cylinder.

JEAN JONES YEAROUT.

REFERENCES CITED

The following references are of record in the file of this patent:

UNITED STATES PATENTS

| Number | Name | Date |
| --- | --- | --- |
| 1,199,590 | Martin | Sept. 26, 1916 |
| 2,268,592 | Hothersall | Jan. 6, 1942 |
| 2,487,825 | Olvis | Nov. 15, 1949 |